United States Patent [19]
Chaussade et al.

[11] Patent Number: 5,650,208
[45] Date of Patent: Jul. 22, 1997

[54] WINDOW EQUIPPED WITH ELECTROSTATIC PROTECTION CIRCUIT

[75] Inventors: Pierre Chaussade; Thierry Mannevy-Tassy, both of Sully Sur Loire, France

[73] Assignee: Saint-Gobain Vitrage, Courbevoie, France

[21] Appl. No.: 494,876

[22] Filed: Jun. 26, 1995

[30] Foreign Application Priority Data

Jun. 30, 1994 [FR] France .................................. 94 08050

[51] Int. Cl.⁶ .................................................. H05F 3/02
[52] U.S. Cl. ........................ 428/38; 428/379; 428/385; 428/412; 428/922; 29/611; 219/50; 219/56.1; 219/203; 219/522; 219/528; 219/544; 244/1 A; 244/134 D; 361/217; 361/218
[58] Field of Search .......................... 428/38, 425.6, 428/426, 209, 379, 385, 412, 922; 29/611; 219/50, 56.1, 203, 522; 244/1 A, 134 D; 361/217, 218

[56] References Cited

U.S. PATENT DOCUMENTS

| | | | |
|---|---|---|---|
| 4,078,107 | 3/1978 | Bitterice et al. | 428/38 |
| 4,590,535 | 5/1986 | Mang | 361/218 |

*Primary Examiner*—Patrick Ryan
*Assistant Examiner*—Cathy F. Lam
*Attorney, Agent, or Firm*—Oblon, Spivak, McClelland, Maier & Neustadt, P.C.

[57] ABSTRACT

A laminated window includes at least one rigid external substrate (5) and a sheet made of flexible plastic material (6) which is adjacent to the substrate (5). The window is equipped with an electrostatic protection circuit which is capable of dissipating the charges which have accumulated on the external sheet (7). This circuit includes conducting elements (2) which cross through at least the substrate and at least one part of the sheet made of plastic material (6). The conducting elements (2) are connected to a collector element (3) which is connected to the ground (4) and embedded in the sheet made of flexible plastic material (6).

13 Claims, 3 Drawing Sheets

WINDOW EQUIPPED WITH ELECTROSTATIC PROTECTION CIRCUIT

SUMMARY OF THE INVENTION

1. Field of the Invention

This invention pertains to a laminated window equipped with an electrostatic protection circuit to dissipate electrostatic charges which are capable of accumulating on one side of the window, in particular a laminated window which may be used in the aviation industry and which is composed of a sheet of rigid plastic material such as methyl polymethacrylate (PMMA) and an external sheet. The invention also pertains to the method for fabricating such a window.

2. Description of the Related Art

Such windows, especially those used in the aviation industry, can be subjected in flight to an accumulation of electrostatic charges on the external sheet of the window. These charges can reach a potential which is capable of creating an electric discharge along the side of the window and/or a discharge within the body of the window, especially when the window is equipped with an electric heating circuit. This discharge can locally modify the properties of the window, that is, it can create holes and/or microcarbonization, which deteriorates its optical properties.

It is known from U.S. Pat. No. 4,078,107 that the external side of the window can be covered with a conducting coating in order to dissipate the electrostatic charges which are present on the external sheet. A surface discharge can thereby be avoided, but a discharge within the body of the window can be produced. In addition, this coating can be at least partially removed by, among other phenomena, abrasion caused by movement of the windshield wipers and by operations such as cleaning, polishing, etc., which reduces the efficiency of the coating.

It is known from U.S. Pat. No. 4,590,535 that conducting elements which cross through the thickness of the external rigid sheet, are connected electrically to other conducting elements located on the inner side of the external sheet and are connected to a ground, can also be provided. Several independent circuits which are capable of draining off the electrostatic charges should be provided for reasons of safety. The time and cost of fabrication of such a window are increased by these measures.

SUMMARY OF THE INVENTION

It is an object of the present invention to provide a window equipped with an electrostatic protection circuit which prevents the formation of both surface discharges and discharges within the body of the window, this circuit not being impaired by any abrasion to which the window is subjected.

It is a further object of the present invention to provide a window equipped with such a circuit, whose fabrication is relatively simple.

It is yet a further object of the present invention to provide a window equipped with a single electrostatic protection circuit, without the latter impairing the reliability of the window.

The above and other objects are achieved according to the present invention by a laminated window which includes at least one external rigid substrate and a sheet made of flexible plastic material, adjacent to the substrate, the latter including an external sheet which is capable of storing electrostatic charges, said window being equipped with an electrostatic protection circuit which is capable of dissipating the charges which accumulate on the external sheet of the substrate. This circuit includes conducting elements which pass through the substrate and pass through at least one part of the sheet made of flexible plastic material, these conducting elements being connected to a collector element which is in turn connected to the ground embedded in the plastic material.

The fact that the collector element is embedded in a sheet of flexible plastic material and is not in contact with the external rigid substrate allows one to improve, according to the inventors, its mechanical and thermal resistance. The sheet of flexible plastic material absorbs, to a certain degree, the possible expansions and/or contractions which the external substrate might be subjected to, the latter being caused, in particular, by the great temperature differences to which a window in flight is subjected. According to one mode of implementation of the invention, the collector element is located in the sheet made of flexible plastic material in a plane different from that of the interface between the rigid external substrate, and said sheet made of flexible plastic material.

By "external rigid substrate" is meant a monolithic substrate or laminated sheet of plastic material. By sheet of flexible plastic material we mean, according to the invention, one or several adjacent sheets, which are formed by one or several folds (or layers), of flexible polyurethane or, preferably, polyvinylbutyral.

By "embedded" is meant that the collector element is completely embedded between two layers or two folds of the flexible plastic material or that the collector element is encrusted or partially encrusted in the side of the flexible plastic material layer opposite the substrate.

In order not to harm the optical quality of the window the conducting elements are perpendicular to the plane of the window, the collector element being parallel to this plane. The collector element describes one or several lines connected to one another, parallel to the plane of the window. The spacing between the different conductor elements must be such that there is no danger of the occurrence of a short circuit. This distance is, for example, between 3 and 15 cm.

Advantageously, the conductor elements consist only of a single wire or conductor filament. The filament can, possibly, form a loop near the side on which electrostatic charges might accumulate in order to strengthen, to some degree, this end which is subjected to external loads.

According to a preferred variant of the invention the collector element and the conductor elements consist of the same wire or conductor filament, each conductor element forming, in addition, a loop. The fabrication of such a circuit is then particularly easy to implement.

A single protection circuit according to the invention is generally sufficient to ensure the desired protection with complete safety. Nevertheless, the window can also be equipped with several electrostatic protection circuits for some applications.

According to another feature of the invention, the window also includes a heating circuit in order to eliminate frost, snow and/or condensation which can form on the window. This circuit includes, in the traditional manner, heating elements located in a plane parallel to the window, such as thin electrical resistance wires or a conducting layer, connected electrically to at least one collecting strip connected to the ground. In order to improve efficiency of the heating circuit, the heating elements are, normally, located near the internal side of the substrate.

Each conductor element of the electrostatic protection circuit in accordance with the invention crosses through the heating circuit. These two circuits, the electrostatic protection circuit and the heating circuit, are nevertheless independent. However, it is necessary to avoid creation of a short circuit which can be produced between these two relatively nearby circuits. According to a variant, each conductor element of the anti-static circuit in accordance with the invention will pass between two thin electrical resistance wires, the material constituting the flexible plastic material being sufficient to isolate these two circuits. According to another variant, the heating element is a conducting layer located in an intermediate plane between the external side of the window and the plane which contains the collector element. The layer can then form two heating circuits which are separated by an intermediate zone in which the conductor elements pass. The wire which forms the conductor can also be enclosed in an insulating material.

According to a preferred variant, the collector element of the electrostatic protection circuit is connected electrically to the collecting strip of the heating circuit, which is connected to the ground located, for example, on the edge of the window. A single connection to the ground is therefore sufficient for these two circuits. The heating elements can advantageously be located in a plane different from the plane of the collecting strip of the heating circuit, these two planes being parallel to the plane of the window. Some thin electrical resistance wires are then advantageously turned by 180° in the space which separates the edge of the window from the collecting strip in order to return into the plane of the collecting strip, in order to be connected there to the aforementioned collecting strip. This arrangement results in more flexibility of the heating network wires.

The invention also pertains to a method of fabrication of a window according to the invention. According to this method the rigid external substrate is assembled with the sheet of flexible plastic material. The conductor elements are then introduced into passages which are previously provided in said assembly, the conductor element being embedded in the sheet of flexible plastic material before or after assembly, and it electrically connects each of the conductor elements and is connected to the ground. In a preferred manner, at least one of the sheets of flexible plastic material which form the window is provided with a heating circuit, the sheet being a sheet which is part of the make-up of the rigid external substrate, or the sheet of flexible plastic material is provided with the collector element.

The window can also be fabricated according to another method without departing from the scope of the invention.

BRIEF DESCRIPTION OF THE DRAWINGS

Other advantages and characteristics of the invention will appear in the following description, which is given with reference to an example and figures in which:

FIGS. 2a to 2c are sectional views of three examples of windows according to the invention, at the plane of section A—A of the window shown in FIG. 1a;

DETAILED DESCRIPTION OF THE PREFERRED EMBODIMENTS

FIGS. 1a–1d illustrate, by way of non-limiting example, several possible paths of the lines (e.g., electrically conductive wires) and elements of a circuit which is capable of eliminating electrostatic charges which have accumulated on an external sheet of window 1 according to the invention, generally a transparent sheet made of rigid plastic material such as acrylic, methyl polymethacrylate (PMMA), particularly polycarbonate, polyester or rigid polyurethane. The anti-static circuit according to the invention includes conductor elements 2 which are perpendicular to the plane of the window. One end of each of the conductor elements 2 is connected to a collector 3 whose end is connected to the ground 4.

Figure 1A:
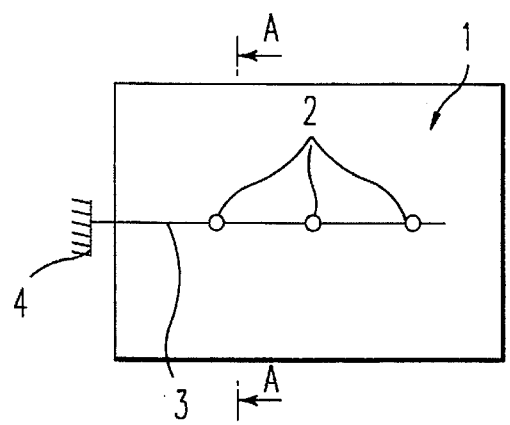
FIGS. 1a to 1d are side views of four examples of windows provided with an electrostatic protection circuit in accordance with the invention.
Figure 1B:
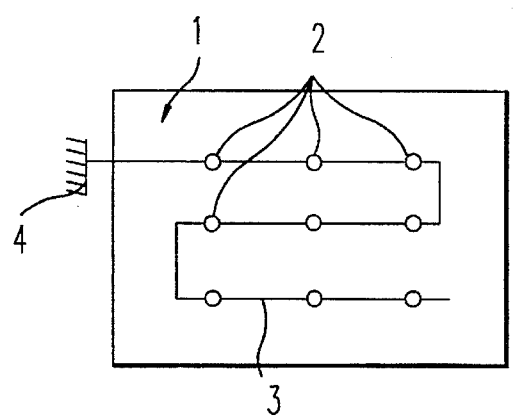
Figure 1C:
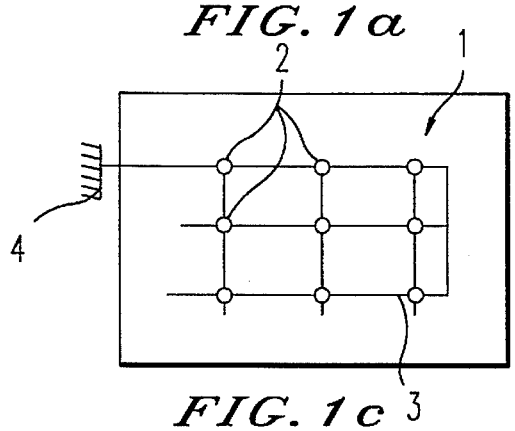
Figure 1D:
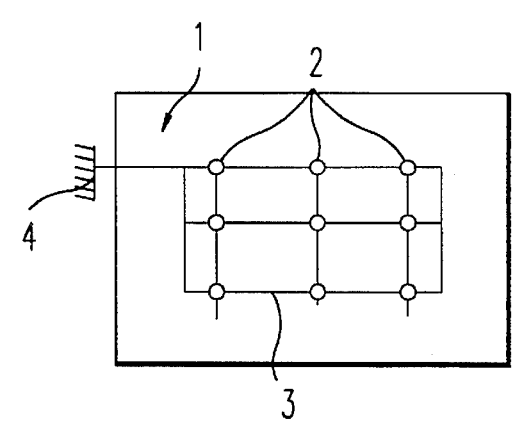

The collector can describe only a single line parallel to the plane of the window, as illustrated in FIG. 1a. It can also describe several lines parallel to the plane of the window, as illustrated in FIGS. 1b, 1c and 1d, each of these lines being connected to the adjacent line by one of their ends, alternately, so as to form a sort of crenel, as shown in FIG. 1b. Each of the lines can also be connected to the others by one of their ends, as shown in FIG. 1c, or to their two ends, as shown in FIG. 1d.

Other paths can also be provided to the extent that collector 3 forms only one circuit connected to the ground 4, which electrically connects all conductor elements 2. In a preferred manner, the circuit describes a network with simple geometry so as to limit the number of lines parallel to the plane of the window, the presence of these lines in too great a number possibly decreasing the optical quality of the window.

Figure 2A:
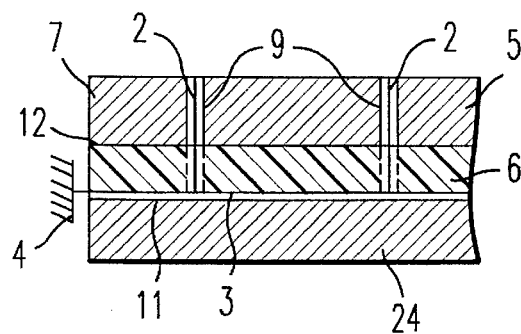
Figure 2B:
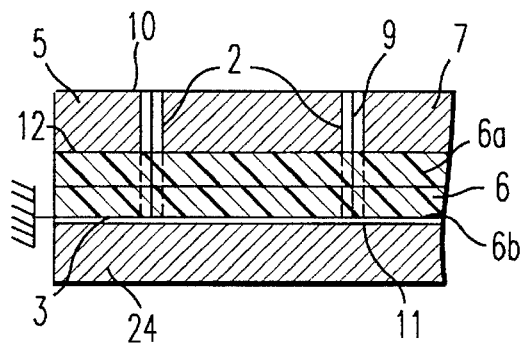
Figure 2C:
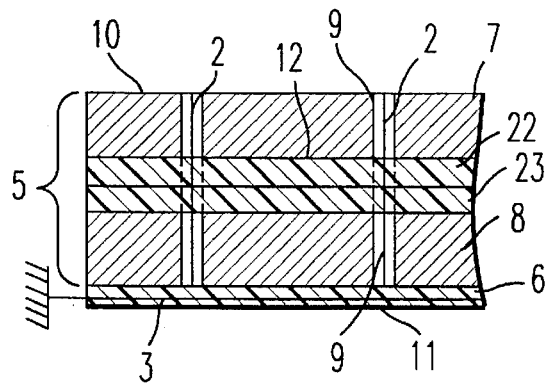

FIGS. 2a–2c present views, along section A—A, of embodiments of the window shown in FIG. 1a. These windows include a rigid external substrate 5 and a sheet made of flexible plastic material 6. The sheet made of a flexible plastic material, e.g., polyvinylbutyral or flexible polyurethane, normally improves the properties of the window, especially its shock absorption. A sheet 6 of flexible plastic material can also be provided as an external sheet, on the interior compartment side, of a cockpit for example, as shown in FIG. 2c. This sheet can impart desirable surface properties, such as resistance to scratching, and anti-brightness protection. This can be a sheet of polyurethane, for example.

In these Figures, the conductor elements 2 pass through the substrate 5 and at least one part of the sheet of flexible plastic material 6. The rigid external substrate can include an external sheet 7, as shown in FIG. 2a or FIG. 2b. It can also include two rigid sheets 7 and 8 between which two sheets of flexible plastic material 22 and 23 are inserted. The window can include, in addition to substrate 5 and the sheet of plastic material 6, other elements such as a rigid sheet 24, as shown in FIGS. 2a and 2b. One can see in these figures that the conductor element 2 can pass through any number of rigid and flexible sheets, according to the anticipated use. The sheet of flexible plastic material 6 can be formed of two sheets 6a and 6b (or more), as shown in FIG. 2b.

Passages 9 are provided in order to allow conductor elements 2 to pass through substrate 5 in at least one part of the sheet of flexible plastic material 6. These passages 9 are, for example, mechanically perforated holes. According to a preferred variant, the external sheet 7 is a drawn acrylic material which has the advantage of improved resistance to occurrence and propagation of cracks. This characteristic is particularly advantageous in the case when several passages 9 are perforated at regular intervals. The parts of the passages at the level of the sheet of flexible plastic material can be obstructed by the movement of the plastic material when the window is being assembled.

The electrostatic protection circuit is such that the conductor elements 2 electrically connect, when the circuit is placed in the window, external side 10 of the external sheet 7 to a collector 3 which is connected to the ground. The electrostatic protection circuit according to the invention thus allows the trajectory of the electrostatic charges present on side 10 of sheet 7 to be controlled across the window to the ground, and this is accomplished upon first use of the window. Discharges due to a considerable potential difference between side 10 and the remaining part of the window can thus be avoided.

The conductor element 2 can pass through any number of rigid and flexible sheets if one of its ends is embedded in a sheet of flexible plastic material, so that the collector is itself embedded in the same sheet of flexible plastic material. The flexibility of this sheet of plastic material will impart an improved mechanical resistance to the conductor elements 2 and, in particular, to the collector 3.

The collector 3 is, in this case, shown near side 11 of a sheet of flexible plastic material which is the most distant from the side 12 of the external sheet 7. This preferred arrangement allows one to improve the flexibility of conductors 2 and of collector 3. In all cases, the collector can be approximately in the middle of the sheet of flexible plastic material or in proximity of side 12 of the external sheet, to the extent that the collector is embedded in the sheet of flexible plastic material and is not in contact with the rigid external substrate.

Figure 3A:
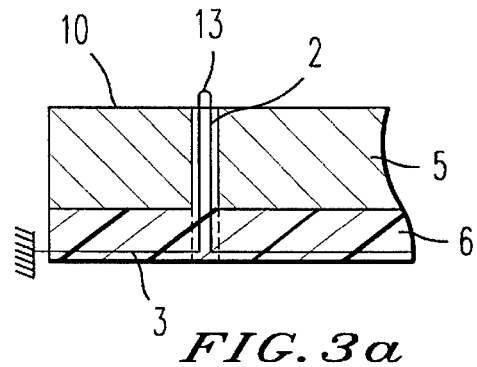
FIGS. 3a to 3d are sectional views showing four examples according to the invention of the end of one conductor element near the external side of the window.
Figure 3B:
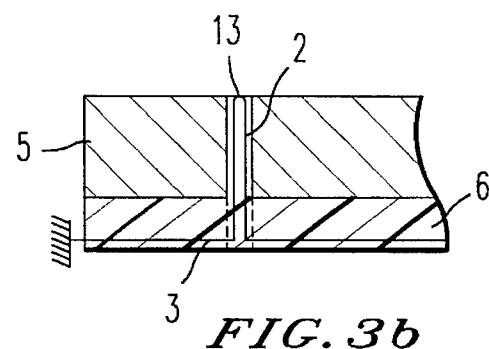
Figure 3C:
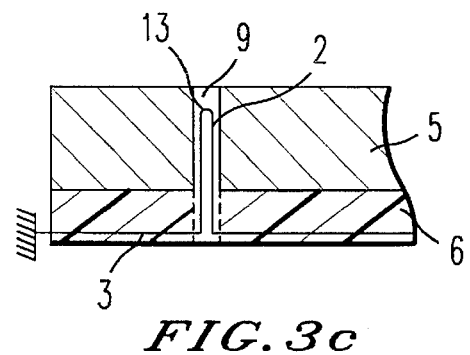

FIGS. 3a–3d presents several enlarged views of conductor elements 2. The conductor elements 2 consist preferably of a filament or wire. This filament can, possibly, form a loop 13 so that it will produce a back and forth movement in passage 9. This loop can, possibly, be coiled. It can extend beyond side 10 of sheet 1 forming a sort of packing, as shown in FIG. 3a, and its end can, possibly, be in contact with side 10. It can also be flush with the surface, or it can be located just below it, as shown in FIGS. 3b and 3c respectively.

Figure 3D:
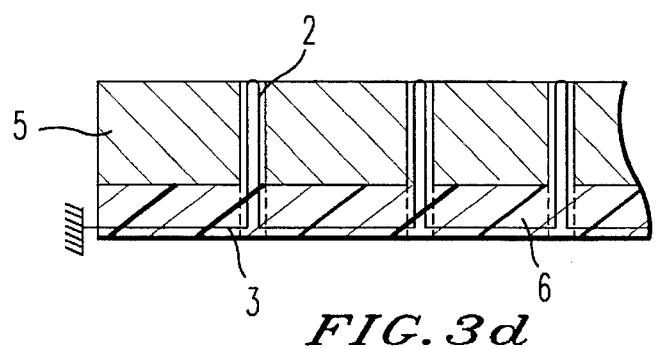
Figure 6:
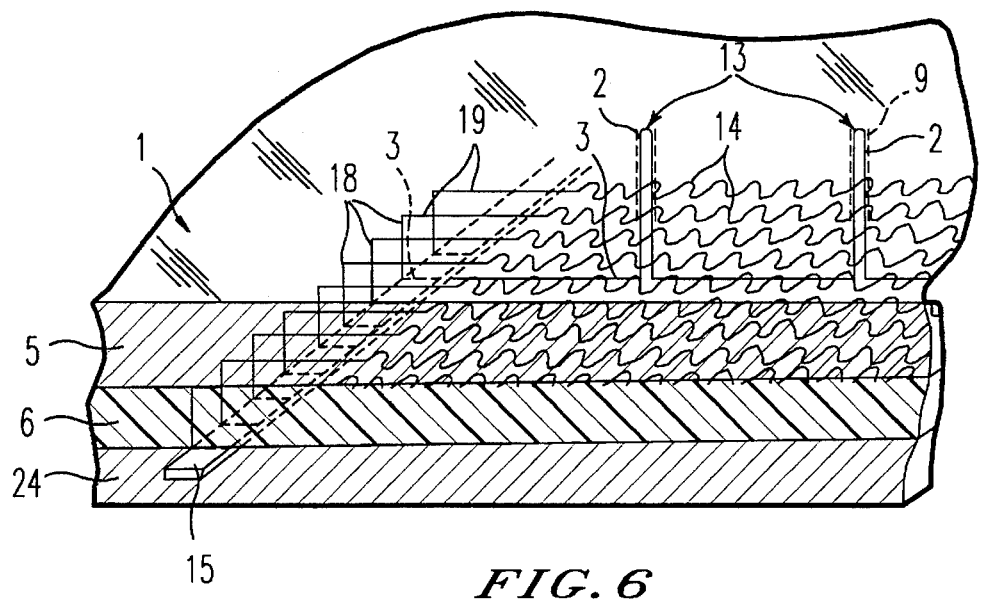
FIG. 6 is a perspective view of the window shown in FIG. 4.

According to a variant which is particularly preferred, collector 3 and conductor elements 2 form only a single conductor wire, as shown in FIG. 3d, which facilitates fabrication of the electrostatic protection circuit in accordance with the invention.

The conductor elements and the collector are made of a material which can conduct electricity. It could be tungsten or a tungsten-based alloy. Their diameter is, for example, on the order of 0.015 mm.

FIGS. 4 to 7 give preferred variants of the invention according to which the window includes a heating circuit and an electrostatic protection circuit.

Figure 4:
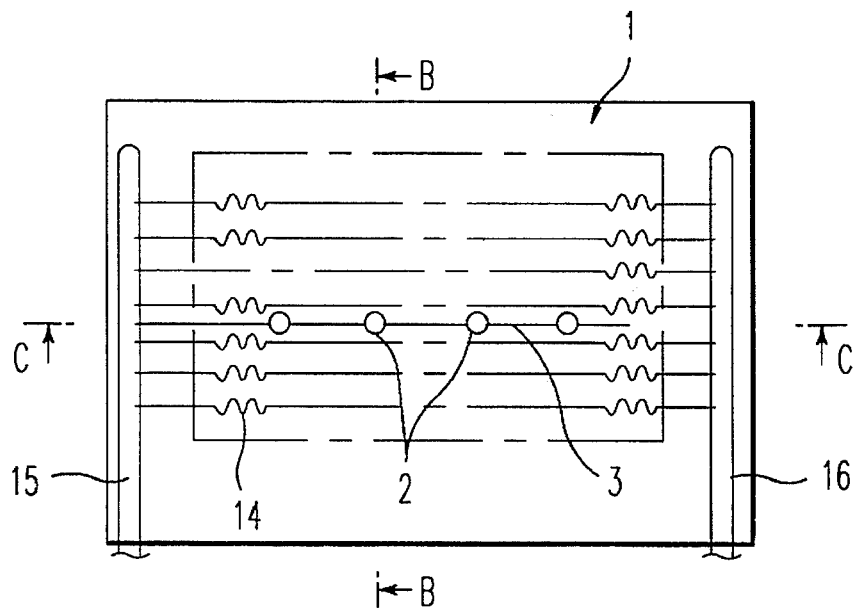
FIG. 4 shows a heating window provided with an anti-static circuit in accordance with the invention.
Figure 7:
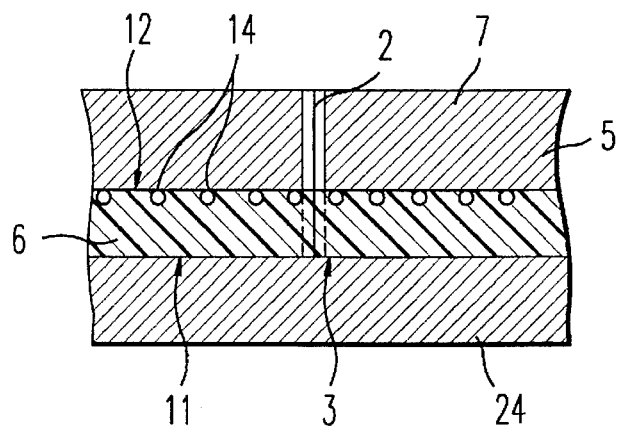
FIG. 7 shows a cut-away view, at section B—B, of the window shown in FIG. 4.
Figure 8:
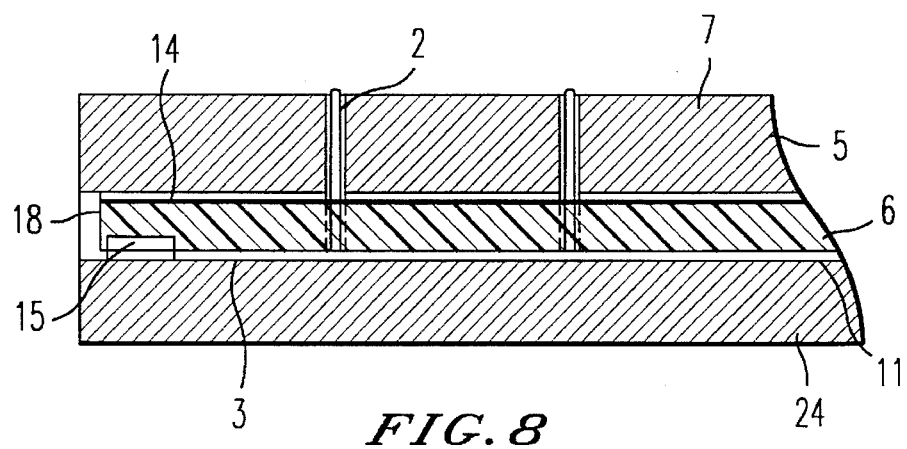
FIG. 8 shows a cut-away view, at section C—C, of the window shown in FIG. 4.

FIG. 4 shows a side view of the window of the invention. The electrostatic protection presented here occupies only one part of the window. The window includes a substrate 5 made of methyl polymethacrylate (PMMA) and a sheet of plastic material 6 which is formed, in this case, by several layers of PVB and a sheet 24 of PMMA. The conductor elements 2 are located in the dense part of the heating network which is normally in the central part of the window. Possible optical deteriorations are thereby limited. Note that the heating wires 14 and the collector 3 are located in two parallel planes, as can be seen better in FIGS. 6 and 8, so that they are not in contact with but separated by at least one part of the thickness from the sheet made of flexible plastic material, a dielectric 6, as shown in FIGS. 7 and 8.

The heating circuit shown here includes thin electrical resistance wires 14 which are embedded, at least partially, in a sheet 6 made of flexible plastic material. Each of the ends of these wires is connected electrically to two connecting strips 15 and 16 of which one, for example the collecting strip 15, is connected to the ground, while the other, for example collecting strip 16, is connected to a common power supply. The thin electrical resistance wires 14 are, preferably, located near side 12 of the flexible plastic material sheet, side 12 constituting, to a certain degree, the interface with the external sheet 7 which makes up the external substrate 5: the efficiency of the heating circuit is thereby improved. The two collecting strips are located on one side of a sheet made of flexible plastic material other than the side on which the heating wires are found.

In these figures, collecting strips 15 and 16 are located on side 11 of sheet 6 made of flexible plastic material, while heating wires 14 are located on side of sheet 6 near side 12 of the external sheet 1. In order to connect the heating wires 14 to the collecting strip 15, the latter are turned by 180° in the space located between the collecting strip 15 and the edge of the window. This turning back is shown at 18. For reasons of convenience, the thin electrical resistance wires 14 are straight at 19, while they are wavy in the central part of the window or, more precisely, in the main part of the space separating the two collecting strips 15 and 16 in order to improve their heating capability.

Figure 5:
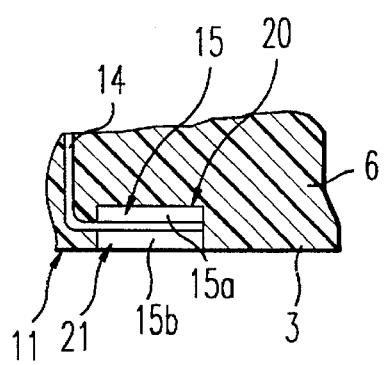
FIG. 5 is a partial detail of the window of FIG. 4.

FIG. 5 shows, in a more detailed way, the connection of the heating wires 14 to the collecting strip 15. The heating wires 14 are, normally, inserted between two foils of 15a and 15b which form the collecting strip.

The electrostatic protection circuit is, for its part, made of conductor elements 2, which are connected electrically to a collector 3 located on the same side of a sheet of flexible plastic material as the collecting strip 15 which is connected to the ground. The collector 3 is connected electrically to the collecting strip 15, by soldering for example, as shown in FIG. 5. Of course, according to the position of the collector in the sheet of flexible plastic material 6, it can be connected on side 20 or 21 of the collecting strip 15.

The configuration and the position of the two circuits, the heating circuit and the anti-static circuit, are such that the optical quality of the window is not altered and the two circuits are insulated electrically from one another in order to avoid any short circuit. Otherwise, the configuration and the position of the circuits take into consideration the constraints and loads which the window can be subjected to in flight. According to the invention, the two circuits are overlapped, as one can see in FIGS. 4, 7 and 8, the conductor elements being located between two heating wires. The distance between a heating wire 14 and a conductor element 2 is such that the electrical insulation is sufficient between these two materials and is greater than the diameter of passage 9.

The section in FIG. 8 illustrates the return of the heating wires 14. This characteristic allows one, moreover, to heat the marginal parts of the window located between the edge and the collecting strip 15. Otherwise it improves the flexibility of the heating wire, and therefore its thermal resistance, especially for temperature differences which can occur during flight.

In FIGS. 4 to 8, the conductor elements cross through the substrate which includes the rigid external sheet 7, which here makes up the substrate, and at least one part of a sheet 6 made of flexible plastic material. The substrate can also include other rigid and/or flexible sheets, as, for example, shown in FIGS. 1 to 3, independently of the existence of the heating circuit.

In order to fabricate the window described in FIGS. 4 to 8 one can first fabricate a sheet of flexible plastic material 6 which includes a heating network, the thin electrical resistance wires and the collecting strips being on two opposite sides of said sheet. This sheet is then, for example, heat sealed with the external rigid sheet 7. Passages 9 are then perforated, for example mechanically, in order to introduce the conductor elements 2. The latter are inserted and then connected, for example soldered, to a collector 3 which is previously deposited on sheet 6, or a conductor filament is inserted in each of the passages while connecting them in order to make up conductor elements 2 and collector 3. One of the ends of collector 3 is connected to the ground, by soldering for example. It is preferably connected to the collecting strip of the heating circuit connected to the ground. The assembly made of sheets provided with heating and anti-static circuits is then assembled, possibly with other sheets becoming part of the make-up of the window.

EXAMPLE

Three samples of windows were made and tested. These samples were made of two rigid sheets of methyl polymethacrylate (PMMA) between which two flexible sheets made of polyvinylbutyral (PVB) were inserted. A heating network was embedded in the depth of one of the two sheets made of PVB. The thicknesses of these sheets were 1.3 and 4 mm for rigid sheets and 0.63 and 1.3 mm for the PVB sheets.

Sample 1 did not have electrostatic protection. One can observe a perforation in the thickness of the window for a voltage of 160 kV, which corresponds to a current on the order of 300 mA/m$^2$ or on the order of 80 mA for the tested sample. This test illustrates the critical threshold, which is 80 mA, not to be exceeded in order to avoid any chance of discharge across the thickness of the window.

Eight electrodes were placed at 3 cm from the samples. These electrodes simulated the production of electrostatic charges on the surface of the rigid sheet made of PMMA.

Sample 2 included three conductor elements which were separated by 8 cm according to the configuration shown in FIGS. 2b and 3d.

Sample 3 included six conductor elements which were separated by about 5 cm and are arranged according to the same configuration as Sample 2.

The conductor elements were flush with the external surface of the rigid sheet made of PMMA for the two samples.

The strength of the current in the conductor elements and the collector was then measured.

The results were the following:

|  | Sample 2 | Sample 3 |
| --- | --- | --- |
| Applied voltage (kV) | Measured current (mA) | Measured current (mA) |
| 20 | 11 | 11 |
| 24 | 23.5 | 32.5 |
| 26 | 36 | 46 |
| 30 | 62 | 110 |
| 32 | 83.5 | 145 |
| 36 | 130 |  |
| 38 | 150 |  |

Measurable currents were observed beginning with relatively weak voltages. The electrostatic charges were removed, to a certain degree, as they appeared. Note that the value of 80 mA was observed for voltages of 32 and 29 kV, for Samples 2 and 3 respectively.

The values which were obtained for the two types of protection appear to have relatively similar efficiency with regard to the break down voltage threshold (160 kV), the voltage values being 5 to 6 times less than the break down voltage. Otherwise, the applied voltage was increased for each sample in order to obtain a current on the order of 150 mA in order to test the resistance of the circuit for an abnormally elevated current. The two types of protection did not undergo any deterioration.

This sample shows the effectiveness of the protection circuit which can be relatively simple (3 conductor elements) when the conductor elements are placed in the zone of the window which is subjected to these electrostatic charges.

Obviously, numerous modifications and variations of the present invention are possible in light of the above teachings. It is therefore to be understood that the invention may be practiced otherwise than as specifically described herein.

What is claimed is:

1. A laminated window comprising:
   at least one external rigid substrate which is capable of being loaded with electrostatic charges;
   a sheet of flexible plastic material adjacent to the substrate; and
   an electrostatic protection circuit which can dissipate the charges which have accumulated on the external sheet, said circuit comprising:
   a) an electrically grounded collector element embedded in said sheet of flexible plastic material, and
   b) conductor elements which pass through at least said substrate, wherein said conductor elements pass through at least one part of said sheet of flexible plastic material and are electrically connected to said collector element.

2. The laminated window according to claim 1, wherein said collector element is not coplanar with an interface between said substrate and said sheet of flexible plastic material.

3. The laminated window according to claim 1, wherein said conductor elements extend substantially perpendicular to the plane of the window, and wherein said collector element extends in a plane substantially parallel to the plane of the window.

4. The laminated window according to claim 1, wherein said sheet of flexible plastic material is made of polyvinylbutyral.

5. The laminated window according to claim 1, wherein said conductor elements are made of only one conductor wire or filament.

6. The laminated window according to claim 5, wherein said conductor elements are made of one wire or filament forming a loop near an external side of the external rigid substrate which is capable of being loaded with electrostatic charges.

7. The laminated window according to claim 6, wherein said conductor elements and said collector element are comprised of the same filament.

8. The laminated window according to claim 1, wherein said collector element forms plural lines connected to one another.

9. The laminated window according to claim 3, further comprising a heating circuit including heating elements, wherein each of said conductor elements passes through said heating circuit.

10. The laminated window according to claim 9, wherein said heating elements comprise thin electrical resistance wires connected electrically to at least one grounded collecting strip, each of said conductor elements passing between two of said thin electrical resistance wires.

11. The laminated window according to claim 9, wherein said heating elements each comprises a conducting layer lying in a plane which is between the external surface of said external rigid substrate which is capable of being loaded with electrostatic charges and the plane of said collector element.

12. The laminated window according to claim 10, wherein said collector element is connected electrically to said collecting strip of the heating circuit.

13. The laminated window according to claim 10, wherein said heating elements and said collecting strip of the heating circuit are located in two different planes which lie parallel to the plane of the window, and wherein said thin electrical resistance wires are turned by 180° in a space which separates the collecting strip from the heating elements at the edge of the window.

* * * * *